July 20, 1965  R. M. JOHNSON  3,195,686
ENERGY ABSORBENT STRUCTURE
Filed Feb. 27, 1964
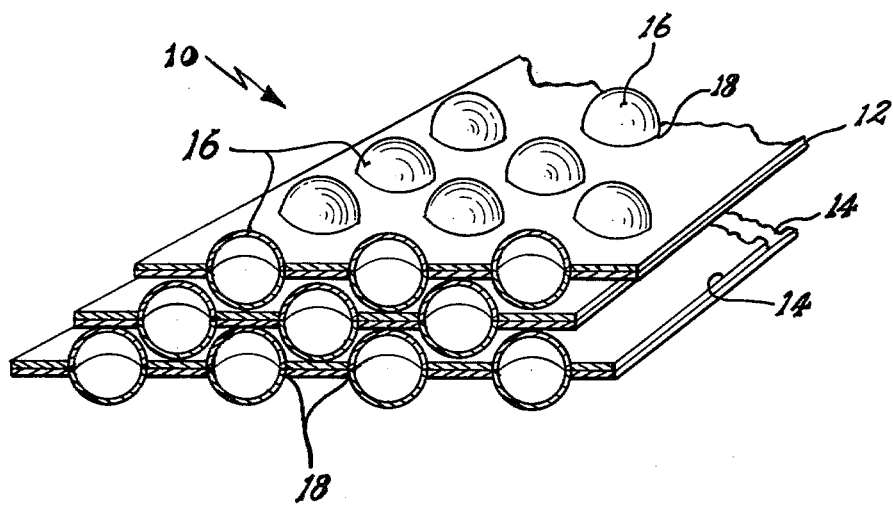
INVENTOR.
RICHARD M. JOHNSON
BY
ATTORNEYS

United States Patent Office 3,195,686
Patented July 20, 1965

3,195,686
ENERGY ABSORBENT STRUCTURE
Richard M. Johnson, Dallas, Tex., assignor, by mesne assignments, to the United States of America as represented by the Secretary of the Air Force
Filed Feb. 27, 1964, Ser. No. 347,981
2 Claims. (Cl. 188—1)

This invention relates generally to energy absorbers and more particularly to shock absorbing means for use with landing capsules bearing astronauts and/or instrumentation.

Shock absorbers have always had great importance in the balloon or parachute dropping of military equipment, instrumented landing capsules and personnel. Additional importance has been given to this field because of the specialized requirements for the landing of space capsules on the earth, moon, or other heavenly bodies. The previously utilized energy absorbent devices took advantage of the properties of springs, airfilled bags, foam plastic pads, either hollow or honeycombed, oleo shock absorbers and empty cans embedded in plastic. These prior art devices have shortcomings. For example, springs and airfilled or inflated bag structures are subject to bouncing on impact, while honeycombed structures are subject to break-out when forces are applied. In addition, the effectiveness of this type is limited to only one direction. Oleo type shock absorbers, utilizing oil flow through an orifice, are subject to changes in viscosity with temperatures, thereby limiting their usefulness to particular conditions where the temperature is controlled.

The device of this invention effectively absorbs the kinetic energy of a landing object while maintaining an omni-directional capability having a smooth load stroke curve. In addition, the disadvantages of the previously utilized energy absorbent structures are overcome in that the device of the instant invention has no bounce, is not affected by changes in temperature, is not subject to high break-out and is omni-directional.

It is an object of this invention, therefore, to provide a means for safely decelerating a space capsule or parachuted object, thereby minimizing damage to personnel or delicate instrumentation.

It is another object of this invention to provide a decelerating device which will prevent bouncing upon impact of the deceleration device with a solid object.

It is a further object of this invention to provide an energy absorbent structure which is unaffected by temperature.

It is a still further object of this invention to provide an energy absorbent structure which is omni-directional and is not affected by the angle of impact.

It is another object of this invention to provide an energy absorbent device capable of absorbtion of kinetic energy of a landing mass in a smooth load curve.

It is a still further object of this invention to provide an energy absorbent structure which is easy and economical to produce of standard, currently available materials that lend themselves to standard mass production manufacturing techniques.

These and other advantages, features and objects of the invention will become more apparent from the following description taken in connection with the illustrative embodiment in the accompanying drawing wherein the figure is a view, partly in cross-section, of an assembly which is illustrative of the principles of this invention.

In the figure the numeral 10 designates an assembly of aluminum plates 12 in a superposed relationship to form a series of tiers which operates as a shock absorbing unit. The aluminum sheets 14, as shown, are relatively thin and each plate 12, although it may be comprised of a single sheet, is formed of two aluminum sheets 14 which may be fastened together by adhesive or other means. Each tier of plates 12 does not necessarily have to be of the same dimension as the other plates and variations in length would provide additional shock absorbent characteristics. As shown in the figure, each tier of plates 12 has a series of holes drilled therethrough into which is secured a hollow aluminum ball or sphere 16 which may be formed by assembling a pair of hemispheres. The holes or sockets 18 in each tier 12 are staggered with respect to its adjacent tier such that the spheres 16, which are not adjacent the edges of the unit and which do not form the outermost layers, are in contact with eight other spheres in adjacent tiers. In order to achieve this objective each of the spheres 16 must be of uniform size.

Since in theory the point of tangency of a ball to a flat surface or another ball is infinitely small, the spheres 16 of the described embodiment would be deformed very slightly with the initial application of weight or pressure. Additional application of pressure, once deformation has been started, increases the deformation. This deformation provides progressively increased resistance to further pressure embodied on the spheres since the surface area presented by each sphere to the spheres to which it is in contact increases. This action is similar to that utilized in the Brinell Hardness Test where a steel ball is pressed into a substance by a constant weight, the degree of hardness being determined by the width of the depression made by the ball. The greater the distance into the material the ball penetrates, the greater the surface presented to the material being tested, and consequently, the greater the resistance encountered.

By having deformation at eight points on most of the spheres, the efficiency of the entire unit is greater than that achieved by any shock absorbent unit heretofore designed. The assembly of the figure may be as simple as that shown or, alternatively, any crushable or deformable enclosure may be utilized to surround the device. The invention is capable of being formed in modular units which may be combined with similar structures or modules in order to achieve a desired shock absorbent value.

Thus, the novel assemblage of tiers of sandwiched plates having spheres in contact with a number of other spheres provides a shock absorbent structure or deceleration device which is suitable for use with space flight vehicles.

Although the invention has been described relative to a particular embodiment, it should be understood that the invention is capable of a variety of alternative embodiments. For example, more than three tiers may be utilized dependent upon the shock absorbent characteristic desired. In addition, the unit may be supported in a box-like frame and the spheres, tiers and, if utilized, encompassing frame may be made of plastic or any other material capable of providing the desired deformation characteristics. Although described as hollow, the spheres may be filled with, for example, a spongy material.

I intend to be limited only by the spirit and scope of the appended claims.

I claim:
1. A device for absorbing energy on impact comprising a plurality of uniform hollow spheres, layers of flat material having holes therein, said holes being arranged in a geometric pattern to hold said spheres in a sandwiched relation so that each of said spheres in a layer of spheres not in the outer periphery of said device is in contact with eight other spheres in adjacent layers of spheres.

2. A device as defined in claim 1 wherein said spheres contain a spongy material.

References Cited by the Examiner
UNITED STATES PATENTS 2,998,214 8/61 Peterman
3,077,979 2/63 Jones et al. _____ 206—46

MILTON BUCHLER, *Primary Examiner.*
DUANE A. REGER, *Examiner.*